UNITED STATES PATENT OFFICE.

FRITZ HOFMANN, CARL COUTELLE, KONRAD DELBRÜCK, AND KURT MEISENBURG, OF ELBERFELD, GERMANY, ASSIGNORS TO FARBENFABRIKEN VORM. FRIEDR. BAYER & CO., OF ELBERFELD, GERMANY, A CORPORATION OF GERMANY.

CAOUTCHOUC SUBSTANCE AND PROCESS OF MAKING SAME.

1,062,914.     Specification of Letters Patent.     Patented May 27, 1913.

No Drawing.     Application filed March 20, 1911. Serial No. 615,664.

*To all whom it may concern:*

Be it known that we, FRITZ HOFMANN, CARL COUTELLE, KONRAD DELBRÜCK, and KURT MEISENBURG, citizens of the German Empire, residing at Elberfeld, Germany, have invented new and useful Improvements in Caoutchouc Substances and Processes of Making Same, of which the following is a specification.

By our earlier applications Ser. Nos. 578607 and 588173 the production of caoutchouc like substances is described, which may replace natural caoutchouc in its chemical and technical application. The processes for their production consist in converting into caoutchouc like substances erythrene or its homologues in which at least 2 atoms of H are substituted by methyl groups, such as di-, tri- or tetramethylerythrene.

It has now been found that by using mixtures of the starting materials mentioned in the above applications (erythrene and its substitution products) new caoutchouc-like substances can be advantageously produced, with properties different from those of the caoutchouc-like substances above referred to. Caoutchouc-like substances can be thus produced of a composite nature, made up of the polymerization products of the mixtures of erythrene hydrocarbons, and containing such products in most intimate intermixture. A more nearly homogeneous product and a more intimate intermixture can thus be produced by mixing the hydrocarbons before or during the polymerization reaction than is possible by mixing the individual and isolated caoutchoucs already formed.

In order to illustrate the new process more fully the following example is given, the parts being by weight:—A mixture of 100 parts of beta-gamma-dimethylerythrene and 100 parts of cooled erythrene is heated for 3 months in an autoclave to 70–75° C. A very tough and elastic substance is thus obtained made up of the caoutchouc-like substance together with any remaining unchanged hydrocarbons and by-products. By treatment of this substance with steam such hydrocarbons and volatile by-products, if present, can be removed and the caoutchouc-like substance which is insoluble in acetone obtained. Mixtures of the different dimethylerythrenes or of di- with tri-methylerythrenes or of di- with tri- and tetra-methylerythrenes may be used. The new process proceeds in an analogous manner on using agents promoting the polymerization *e. g.* acids or acid salts, etc. When such promoting agents are used, such as acetic acid, the time required for the completion of the process is appreciably shortened.

The new caoutchouc substances are white substances the color of which does not change. They swell up with chloroform or benzene to white hyaline substances from which the liquid can be poured off. They are free from protein substances, which are always contained in the natural caoutchouc and play an important part in it with regard to the elasticity of the natural caoutchouc. They form ozonids being thick oils, nitrosites and brom addition products. These ozonids, nitrosites and brom-addition products differ with the different composite caoutchouc products, and correspond to these different products, and thus indirectly to the particular mixtures of hydrocarbons of which the composite caoutchoucs are polymerization products. Thus the product produced as above described from a mixture of beta-gamma-dimethyl-erythrene and erythrene forms an ozonid, or mixture of ozonids, which, upon decomposition with water yields a mixture of oxygen-containing decomposition products among which succinic aldehyde and acetonyl acetone (a dimethyl derivative of succinic aldehyde) are found.

We claim:—

1. The process of producing a caoutchouc-like substance which comprises polymerizing a mixture of erythrene hydrocarbons including erythrene.

2. The process of producing a caoutchouc-like substance which comprises polymerizing a mixture of erythrene hydrocarbons including erythrene and a poly-methyl substituted erythrene.

3. The process of producing a caoutchouc-like substance which comprises polymerizing a mixture of erythrene hydrocarbons including erythrene and a dimethyl-erythrene.

4. The process of producing a caoutchouc-like substance which comprises polymerizing a mixture of erythrene hydrocarbons including erythrene and diisopropenyl.

5. The process of producing a caoutchouc-like substance which comprises heating a mixture of erythrene hydrocarbons including erythrene under caoutchouc-forming conditions until a caoutchouc-like product results insoluble in acetone.

6. The process of producing a caoutchouc-like substance which comprises heating a mixture of erythrene hydrocarbons including erythrene and a poly-methyl substituted erythrene under caoutchouc-forming conditions until a caoutchouc-like product results insoluble in acetone.

7. The process of producing a caoutchouc-like substance which comprises heating a mixture of erythrene hydrocarbons including erythrene and a dimethyl-erythrene under caoutchouc-forming conditions until a caoutchouc-like product results insoluble in acetone.

8. The process of producing a caoutchouc-like substance which comprises heating a mixture of erythrene hydrocarbons including erythrene and diisopropenyl under caoutchouc-forming conditions until a caoutchouc-like product results insoluble in acetone.

9. The process of producing a caoutchouc-like substance which comprises heating in the presence of an agent promoting polymerization a mixture of erythrene hydrocarbons including erythrene under caoutchouc-forming conditions until a caoutchouc-like product results insoluble in acetone.

10. The process of producing a caoutchouc-like substance which comprises heating in the presence of an agent promoting polymerization a mixture of erythrene hydrocarbons including erythrene and a poly-methyl substituted erythrene under caoutchouc-forming conditions until a caoutchouc-like product results insoluble in acetone.

11. The process of producing a caoutchouc-like substance which comprises heating in the presence of an agent promoting polymerization a mixture of erythrene hydrocarbons including erythrene and a dimethyl-erythrene under caoutchouc-forming conditions until a caoutchouc-like product results insoluble in acetone.

12. The process of producing a caoutchouc-like substance which comprises heating in the presence of an agent promoting polymerization a mixture of erythrene hydrocarbons including erythrene and diisopropenyl under caoutchouc-forming conditions until a caoutchouc-like product results insoluble in acetone.

13. As a new product a caoutchouc-like substance comprising the polymerization product of a mixture of erythrene hydrocarbons including erythrene which product forms a nitrocite, ozonid and brom-addition product, the ozonid upon decomposition with water yielding a plurality of oxygen-containing decomposition products including succinic aldehyde.

14. As a new product a caoutchouc-like substance comprising the polymerization product of a mixture of erythrene hydrocarbons including erythrene and a polymethyl substituted erythrene which product forms a nitrosite, ozonid and brom-addition product, the ozonid upon decomposition with water yielding a plurality of oxygen-containing decomposition products including succinic aldehyde and a polymethyl substituted derivative of succinic aldehyde.

15. As a new product a caoutchouc like substance comprising the polymerization product of a mixture of erythrene hydrocarbons including erythrene and a dimethyl-substituted erythrene which product forms a nitrosite, ozonid and brom-addition product, the ozonid upon decomposition with water yielding a plurality of oxygen-containing decomposition products including succinic aldehyde and a dimethyl substituted derivative of succinic aldehyde.

16. As a new product a caoutchouc-like substance comprising the polymerization product of a mixture of erythrene hydrocarbons including erythrene and diisopropenyl which product forms a nitrosite, ozonid and brom-addition product, the ozonid upon decomposition with water yielding a plurality of oxyen-containing decomposition products including succinic aldehyde and acetonyl acetone.

In testimony whereof we have hereunto set our hands in the presence of two subscribing witnesses.

FRITZ HOFMANN. [L. S.]
    CARL COUTELLE. [L. S.]
    KONRAD DELBRÜCK. [L. S.]
    KURT MEISENBURG. [L. S.]

Witnesses:
    ALFRED HENKEL,
    A. POSEN.